United States Patent
Sakaniwa et al.

(10) Patent No.: US 9,823,020 B2
(45) Date of Patent: Nov. 21, 2017

(54) CHLORINE BYPASS DEVICE

(75) Inventors: Daisuke Sakaniwa, Ibaraki (JP); Junzhu Wang, Ibaraki (JP); Hirokazu Shima, Ibaraki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 177 days.

(21) Appl. No.: 14/371,133

(22) PCT Filed: Apr. 2, 2012

(86) PCT No.: PCT/JP2012/002278
§ 371 (c)(1),
(2), (4) Date: Jul. 8, 2014

(87) PCT Pub. No.: WO2013/111198
PCT Pub. Date: Aug. 1, 2013

(65) Prior Publication Data
US 2014/0366499 A1 Dec. 18, 2014

(30) Foreign Application Priority Data
Jan. 23, 2012 (JP) .................. 2012-010737

(51) Int. Cl.
*B01D 45/00* (2006.01)
*F27D 17/00* (2006.01)
(Continued)

(52) U.S. Cl.
CPC ........... *F27D 17/008* (2013.01); *B01D 53/68* (2013.01); *C04B 7/60* (2013.01); *F27B 7/20* (2013.01); *F27B 15/003* (2013.01); *F27D 7/02* (2013.01); *F27D 17/001* (2013.01); *B01D 45/12* (2013.01); *B01D 2257/2025* (2013.01); *F27D 2017/009* (2013.01)

(58) Field of Classification Search
CPC ........ F27D 17/008; F27D 7/02; F27D 17/001; F27D 2017/009; F27B 7/20; F27B 15/003; C04B 7/60; B01D 53/68; B01D 45/12; B01D 2257/2025
See application file for complete search history.

(56) References Cited

U.S. PATENT DOCUMENTS 2,857,979 A * 10/1958 Van Dijck ................ A41B 3/10
159/31
4,004,898 A * 1/1977 Kalen ....................... B04C 5/20
55/434.1
(Continued)

FOREIGN PATENT DOCUMENTS

JP 2 116649 5/1990
JP 11 35355 2/1999
(Continued)

OTHER PUBLICATIONS

International Search Report dated Jul. 3, 2012 in PCT/JP12/002278 Filed Apr. 2, 2012.

*Primary Examiner* — Dung H Bui
(74) *Attorney, Agent, or Firm* — Oblon, McClelland, Maier & Neustadt, L.L.P.

(57) ABSTRACT

A chlorine bypass device which can cool exhaust gas quickly by mixing extracted exhaust gas with cooling air at high efficiency, to thereby produce fine chloride dust, and increase dust recovery efficiency.

9 Claims, 11 Drawing Sheets

(51) Int. Cl.
*B01D 53/68* (2006.01)
*C04B 7/60* (2006.01)
*F27B 7/20* (2006.01)
*F27B 15/00* (2006.01)
*F27D 7/02* (2006.01)
*B01D 45/12* (2006.01)

(56) References Cited

U.S. PATENT DOCUMENTS

| | | |
|---|---|---|
| 6,017,213 A | 1/2000 | Murata et al. |
| 2002/0178703 A1* | 12/2002 | Ribera Salcedo ........ B04C 7/00 55/338 |
| 2005/0115408 A1* | 6/2005 | Kilgore .................. B01D 45/12 95/271 |
| 2005/0138763 A1* | 6/2005 | Tanner .................... A47L 9/165 15/353 |
| 2005/0161374 A1* | 7/2005 | Hakola .................. B01D 45/12 209/717 |
| 2007/0251386 A1* | 11/2007 | Swank .................. B01D 45/12 95/271 |

FOREIGN PATENT DOCUMENTS

| | | |
|---|---|---|
| JP | 3125248 | 1/2001 |
| JP | 2007 105687 | 4/2007 |
| JP | 2008 239413 | 10/2008 |

\* cited by examiner

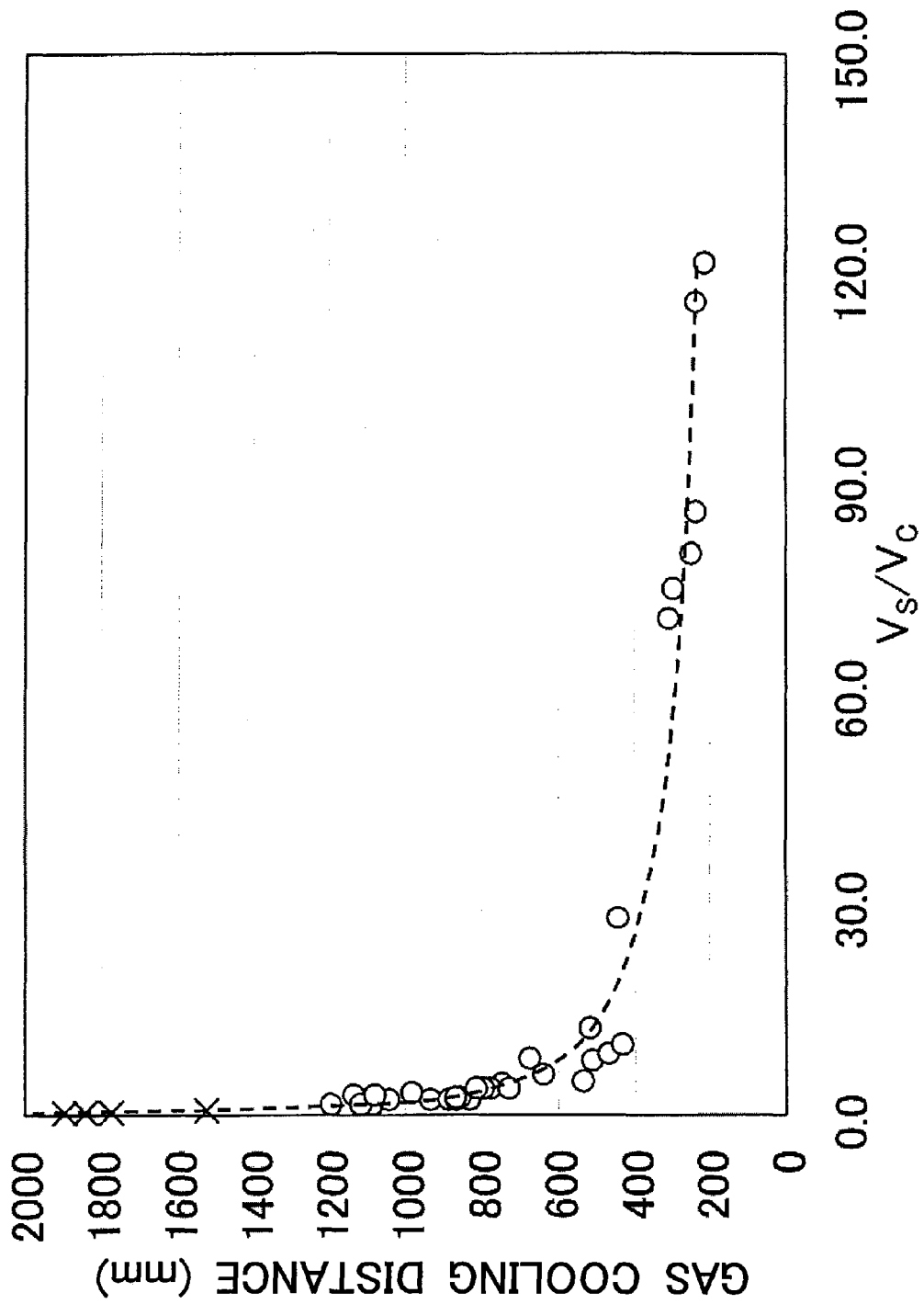

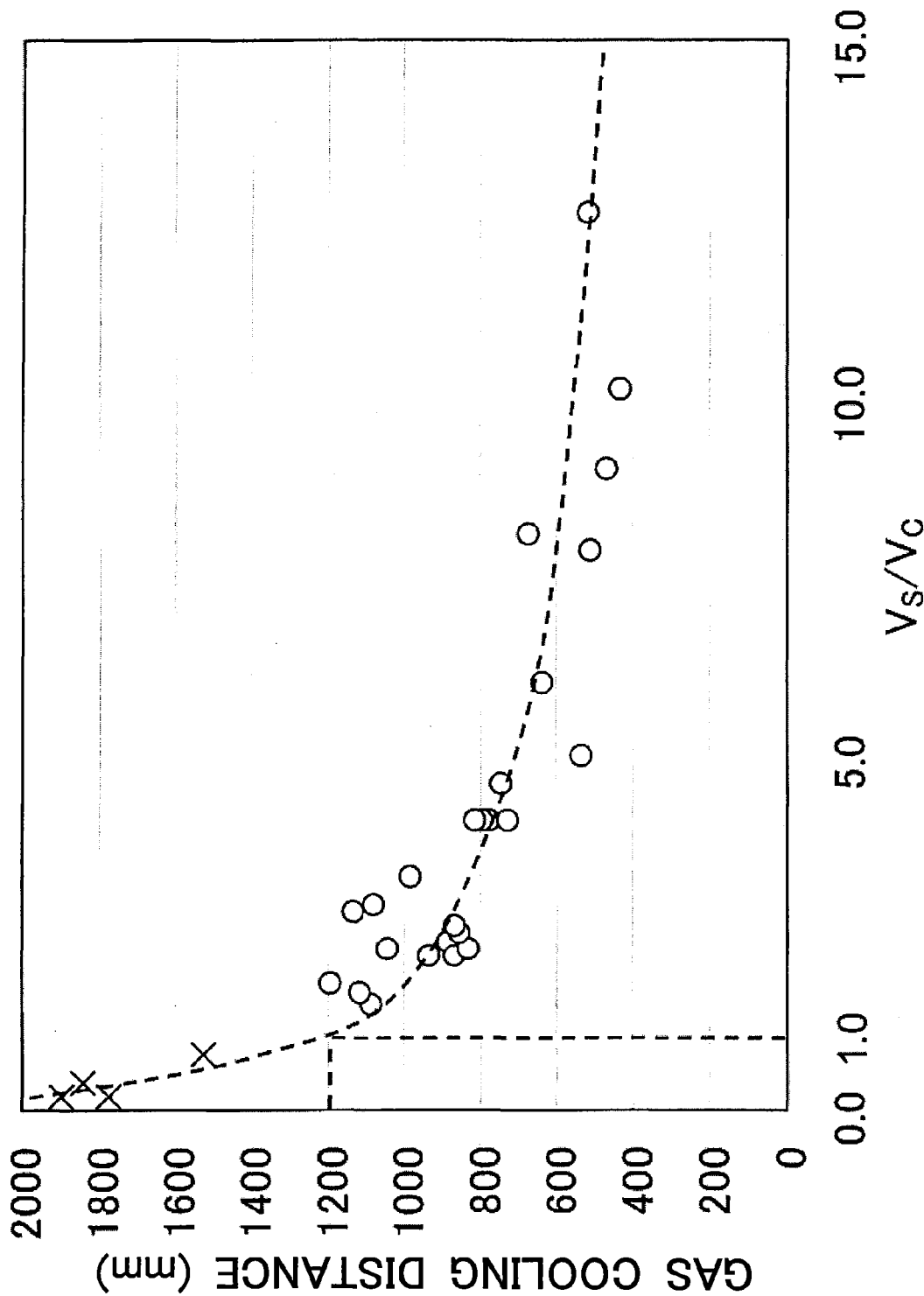

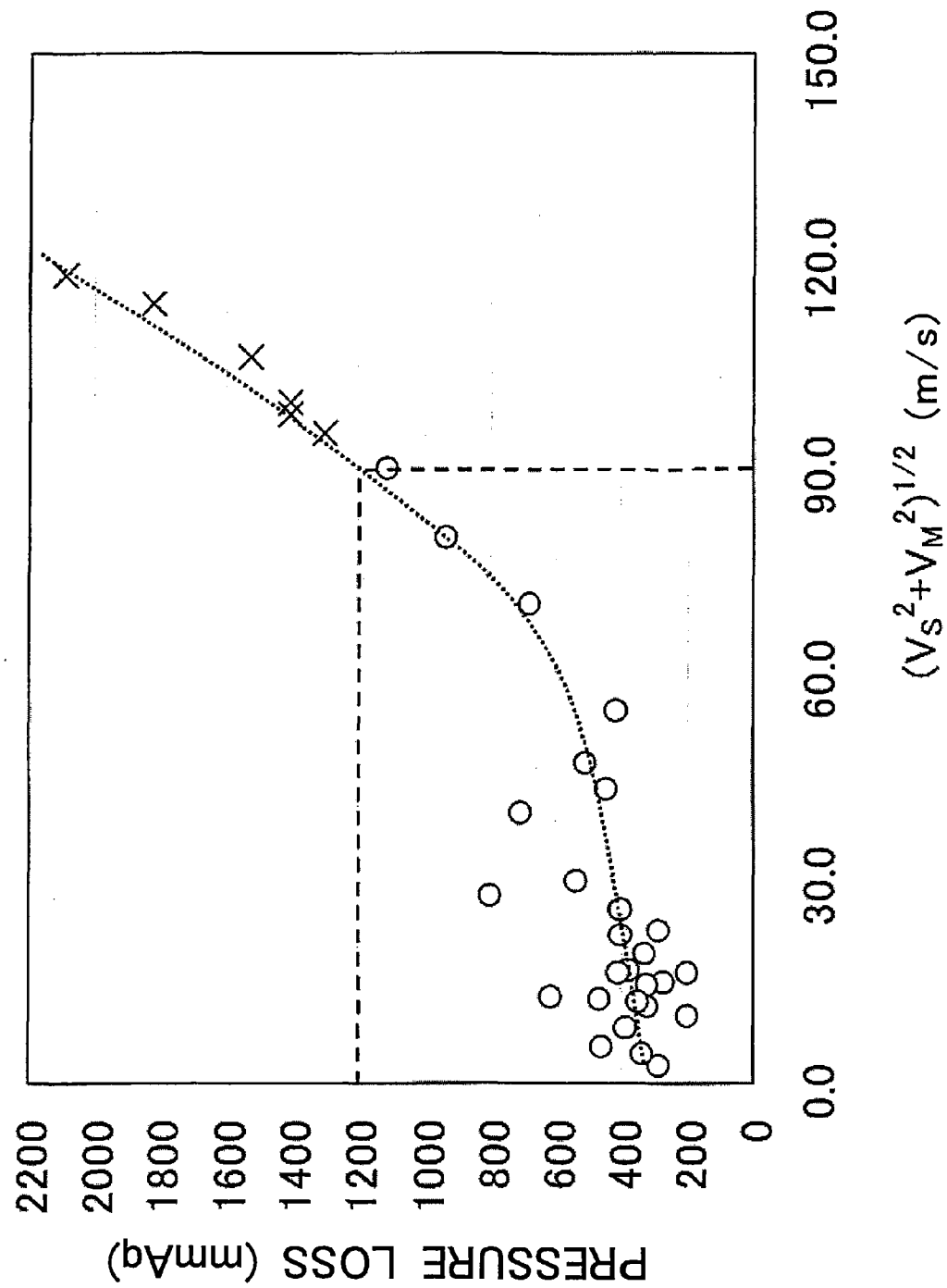

PRIOR ART

CHLORINE BYPASS DEVICE

TECHNICAL FIELD

The present invention relates to a chlorine bypass device installed in cement manufacturing facilities or the like and adapted to reduce chlorine content in the system of the facilities.

BACKGROUND ART

FIG. 10 shows typical conventional cement manufacturing facilities.

The cement manufacturing facilities generally include a rotary kiln 1 adapted to burn cement materials, a preheater 4 equipped with plural cyclones installed in a kiln inlet part 2 of the rotary kiln 1, a chute 5 adapted to supply the cement materials from a cyclone in the last stage of the preheater 4 to the kiln inlet part 2 of the rotary kiln 1, an exhaust line 6 connected to a cyclone in the first stage and adapted to discharge combustion exhaust gas, and a main burner 7 installed in a kiln outlet part 3 and adapted to heat an inner part of the rotary kiln 1.

In the manufacturing facilities for cement clinker described above, the cement materials supplied to the preheater 4 drop to lower cyclones in sequence and get preheated by undergoing heat exchange with high-temperature exhaust gas rising upward from the rotary kiln 1. Then, the cement materials are introduced into the kiln inlet part 2 of the rotary kiln 1 through the chute 5 in the last stage and burned in the process of being sent through the rotary kiln 1 from the side of the kiln inlet part 2 to the kiln outlet part 3 to become cement clinker.

In such cement manufacturing facilities, chlorine compound contained in the cement materials or chlorine compound induced in waste such as plastics inputted as part of fuel volatilizes mainly as alkali chloride such as KCl or NaCl in a high-temperature (approximately 1,400° C.) atmosphere in the rotary kiln 1 and moves into exhaust gas. The exhaust gas is discharged from the kiln inlet part 2 of the rotary kiln 1 to the side of the preheater 4. Then, when rising from lower cyclones to upper cyclones in sequence, the exhaust gas is cooled by preheating the cement materials, and chlorine compound contained in the exhaust gas moves into the side of the cement materials again.

Consequently, since the chlorine content circulates in a system made up of the rotary kiln 1 and the preheater 4, chlorine compound and the like newly carried into the system by the fuel or cement raw materials cause gradual increase in chlorine concentration in the system, eventually blocking the cyclones of the preheater 4 and thereby obstructing the operation. Thus, in recent years, a chlorine bypass device has come to be installed in the cement manufacturing facilities to remove the chlorine compound in the system.

The chlorine bypass device includes an extraction pipe 9 connected to an exhaust gas pipe 8 coming from the kiln inlet part 2 and adapted to extract part of exhaust gas, a cooling pipe 10 adapted to mix the exhaust gas extracted by the extraction pipe 9 with cooling air supplied from a blower 10a and thereby cool the exhaust gas, a cyclone 11 adapted to separate and remove cement materials from the exhaust gas in the extraction pipe 9, and a bag filter (collector) 12 adapted to collect chloride dust contained in the exhaust gas which has passed through the cyclone 11.

The chlorine bypass device described above can periodically or continuously bleed part of the exhaust gas using the extraction pipe 9 when the exhaust gas is discharged from the rotary kiln 1 via the exhaust gas pipe 8, cool the exhaust gas using the cooling pipe 10, thereby condense chloride gas contained in the exhaust gas and separate out chloride dust, then selectively remove dust of cement raw materials with large particle sizes from the exhaust gas using the cyclone 11, subsequently recover chloride dust having small particle sizes from the accompanying exhaust gas using the bag filter 12 in a succeeding stage, and thereby prevent rises in the chlorine concentration in the system.

In the chlorine bypass device of the above configuration, the cooling pipe 10 adapted to mix the exhaust gas extracted by the extraction pipe 9 with cooling air, is intended to cool the exhaust gas temperature to such a level that the exhaust gas can be supplied to the bag filter 12 in a succeeding stage as well as to condense the chloride gas contained in the exhaust gas into chloride dust.

Conventionally, a double wall pipe structure such as shown in FIG. 11 is generally used for such a cooling pipe 10.

The cooling pipe 10 includes an outer pipe 13 connected at one end to the exhaust gas pipe 8 and closed at another end, and a supply pipe 14 connected to the closed end of the outer pipe 13 in a direction orthogonal to the outer pipe 13 and adapted to supply cooling air sent from the blower 10a, wherein the extraction pipe 9 is inserted coaxially into the outer pipe 13 through the closed end of the outer pipe 13.

The cooling pipe 10 is designed such that part of the exhaust gas flowing into the outer pipe 13 from the exhaust gas pipe 8 will be cooled by being mixed with the cooling air in the outer pipe 13 and sent from the extraction pipe 9 to the cyclone 11, where the cooling air is flowing down between the outer pipe 13 and the extraction pipe 9 by being supplied from the supply pipe 14. Incidentally, cooling means found in Patent Literatures 1 to 3 described below generally have a configuration similar to the one described above.

CITATION LIST

Patent Literature

Patent Literature 1: Japanese Patent Laid-Open No. 2007-105687
Patent Literature 2: Japanese Patent No. 3125248
Patent Literature 3: Japanese Patent Laid-Open No. 02-116649

SUMMARY OF INVENTION

Technical Problem

Now, the aforementioned conventional cooling pipe 10, which is configured such that the cooling air supplied from the supply pipe 14 will flow between the outer pipe 13 and the extraction pipe 9, has a problem in that since an inner wall of the extraction pipe 9 is cooled by the cooling air, the chloride gas in the exhaust gas condenses and solidifies gradually on a surface of the inner wall, which tends to result in formation of a coating $C_1$.

In addition, the cooling air descends along an inner wall of the outer pipe 13, resulting in poor mixability between the cooling air and the extracted high-temperature exhaust gas. Moreover, when an extraction amount of the exhaust gas is decreased, a supply rate of cooling air is decreased accordingly. Consequently, there is a problem in that especially at low extraction amount, high-temperature exhaust gas will remain in a wide area in a center portion of the extraction pipe 9, resulting in worse mixability. Also, since in this way, the mixability changes with variation in the extraction amount and strongly tends to worsen with decreases in the extraction amount, there is a problem in that an allowable range of the extraction amount during operation is narrow.

Furthermore, poor mixability results in low cooling effect and thus in difficulty to obtain fine chloride dust, which reduces a difference in a particle size distribution range from the dust of cement materials, making it difficult to separate the two types of dust from each other by means of the cyclone 11 and thereby presenting another problem.

Also, with the cooling pipe 10 of the above configuration, a coating $C_2$ tends to attach to an area around a connection between the outer pipe 13 and the exhaust gas pipe 8. Thus, in order to prevent adhesion of the coating $C_2$, it is useful to cover the area with cooling air as if with an air curtain by lowering the cooling air to this area. However, with the cooling pipe 10, a downward travel distance of cooling air changes with variation in the extraction amount, and thus if one attempts to extend the downward travel distance to near an inlet of the outer pipe 13, the cooling air will blow out into exhaust gas pipe 8 at high extraction amounts, resulting in an increased heat loss in the system.

The present invention has been made in view of the above circumstances and has an object to provide a chlorine bypass device which can prevent adhesion of coatings to an inner wall of an extraction pipe, always cool exhaust gas quickly by mixing extracted exhaust gas with cooling air at high efficiency even if the extraction amount of the exhaust gas changes, thereby produce fine chloride dust, and increase dust recovery efficiency.

Solution to Problem

To solve the above problems, according to a first aspect of the present invention, there is provided a chlorine bypass device comprising: an extraction pipe connected to an exhaust gas pipe and adapted to extract part of exhaust gas containing chlorides; cooling means adapted to supply cooling gas for the exhaust gas into the extraction pipe; and a recovery device adapted to recover chloride dust contained in the exhaust gas extracted by the extraction pipe, wherein the cooling means includes a cooling pipe adapted to cause cooling air to flow into the extraction pipe and a blower adapted to feed the cooling air to the cooling pipe; the cooling pipe includes a revolving portion and an introducing portion, where the revolving portion includes an inner pipe configured to be cylindrical in shape and adapted to surround an outer wall of the extraction pipe via a gap and an outer pipe configured to be cylindrical in shape and placed on an outer side of the inner pipe, the revolving portion is closed between an exhaust-gas-pipe-side end of the inner pipe and the extraction pipe and closed by an annular top panel between an end of the inner pipe and an end of the outer pipe, the end of the inner pipe being on the side opposite the exhaust-gas-pipe-side end, and the introducing portion is defined by a reduced-diameter pipe which is joined at a first end to an exhaust-gas-pipe-side end of the outer pipe of the revolving portion and joined at a second end to the outer wall of the extraction pipe, the second end being reduced in diameter compared to the first end; and a cooling air duct from the blower is connected to the revolving portion so as to introduce the cooling air in a circumferential direction of the revolving portion and a flow inlet adapted to cause the cooling air from the introducing portion to flow into the extraction pipe is formed over an entire circumference of the outer wall of the extraction pipe, thereby forming a flow path for the cooling air, running from the revolving portion to the flow inlet through the introducing portion.

According to a second aspect of the present invention, in the first aspect of the present invention, the inner pipe, the outer pipe, and the reduced-diameter pipe are placed with respective axes brought into coincidence with an axis of the extraction pipe and the cooling pipe is formed so as to satisfy $1.0 \leq V_S/V_C$, where $V_S$ is an average flow velocity of the cooling air in a longitudinal section of the flow path for the cooling air in a direction of the axis and $V_C$ is an average flow velocity of the bleed gas in a cross section orthogonal to a direction of the axis of the extraction pipe.

Furthermore, according to a third aspect of the present invention, in the first or second aspect of the present invention, the inner pipe, the outer pipe, and the reduced-diameter pipe are placed with respective axes brought into coincidence with an axis of the extraction pipe, and the cooling pipe is formed so as to satisfy $(V_S^2 + V_M^2)^{1/2} \leq 90$, where $V_S$ (m/s) is an average flow velocity of the cooling air in a longitudinal section of the flow path for the cooling air in a direction of the axis and $V_M$ (m/s) is an average flow velocity of the cooling air in a longitudinal section of the narrowest portion of the introducing portion.

Also, according to a fourth aspect of the present invention, in any one of the first to third aspects of the present invention, the exhaust gas pipe is used in cement manufacturing facilities to send exhaust gas discharged from a kiln adapted to burn cement raw materials to a preheater adapted to preheat the cement materials.

Advantageous Effects of Invention

According to any one of the first to fourth aspects of the invention, since the revolving portion of the cooling pipe into which the cooling air is introduced is formed into an annular shape, surrounding the extraction pipe of the exhaust gas via a gap, the extraction pipe of the exhaust gas is not cooled by the cooling air flowing through the revolving portion, and thus adhesion of coatings to the inner wall of the extraction pipe can be prevented reliably.

Also, in the cooling pipe, the cooling air introduced in the circumferential direction of the revolving portion via the cooling air duct is supplied from the revolving portion to the introducing portion by revolving around the entire circumference and flows into the extraction pipe through the flow inlet formed around the entire circumference of the outer wall of the extraction pipe. Thus, in the extraction pipe, the extracted exhaust gas and the cooling air are stirred and mixed while revolving intensely, making it possible to produce fine chloride dust by quickly cooling the exhaust gas using the cooling air.

Consequently, since fine chloride dust can be produced by always cooling exhaust gas quickly by mixing extracted exhaust gas with cooling air at high efficiency even if the extraction ratio (the ratio of the extracted amount of the kiln exhaust gas) of the exhaust gas changes, chloride dust recovery efficiency can be increased.

In so doing, when the chlorine bypass device according to the present invention is applied to removal of chlorine content from the exhaust gas discharged from a kiln adapted to burn cement materials in cement manufacturing facilities, for example, as described in the fourth aspect of the present invention, the temperature of the exhaust gas extracted from the exhaust gas pipe is approximately 1,200° C. If a length dimension of a mixing/cooling zone in which the exhaust gas is cooled to 800° C. by the cooling air while flowing through the extraction pipe is defined as a gas cooling distance, and more accurately, as a length dimension between the farthest position from the exhaust gas pipe at which a temperature of 1,200° C. is detectable in a cross section of the extraction pipe and the farthest position from the exhaust gas pipe at which a temperature of 800° C. is detectable in the cross section, the shorter the gas cooling distance, the higher the efficiency with which quick cooling is done by efficient mixing.

Thus, as described in detail in an embodiment later, assuming that $V_S$ is the average flow velocity of the cooling air in the longitudinal section of the cooling air flow path in the direction of the axis and that $V_C$ is the average flow velocity of the bleed gas in the cross section orthogonal to the direction of the axis of the extraction pipe, the inventors examined a relationship between $V_S/V_C$ and the gas cooling distance by varying dimensional data of the cooling pipe and found that when the dimensional data of the cooling pipe is set so as to satisfy $1.0 \leq V_S/V_C$ as described in claim 2, the gas cooling distance becomes 1,200 mm or below at which a desired chloride dust refinement effect is obtained by quick cooling.

Also, in determining the dimensional data of the cooling pipe, if pressure loss in the flow path for the cooling air grows excessively, capacity of a blower or the like used to send the cooling air becomes excessive, resulting in a reduced economy. In this regard, the inventors examined the effect of the average flow velocity $V_M$ of the cooling air in the narrowest portion of the cooling air flow path and found that when the dimensional data of the cooling pipe is set so as to satisfy $(V_S^2+V_M^2)^{1/2} \leq 90$ as described in claim 3, the pressure loss becomes 1,200 mmAq or below which makes blower capacity conventionally used for chlorine bypass fully applicable.

BRIEF DESCRIPTION OF DRAWINGS

FIG. 7 is a graph showing a relationship between $V_S/V_C$ and gas cooling distance in analysis results of Table 1.

FIG. 8 is an enlarged view of principal part in FIG. 7.

FIG. 9 is a graph showing a relationship between $(V_S^2+V_M^2)^{1/2}$ and pressure loss in the analysis results of Table 1.

DESCRIPTION OF EMBODIMENTS

Figure 1:
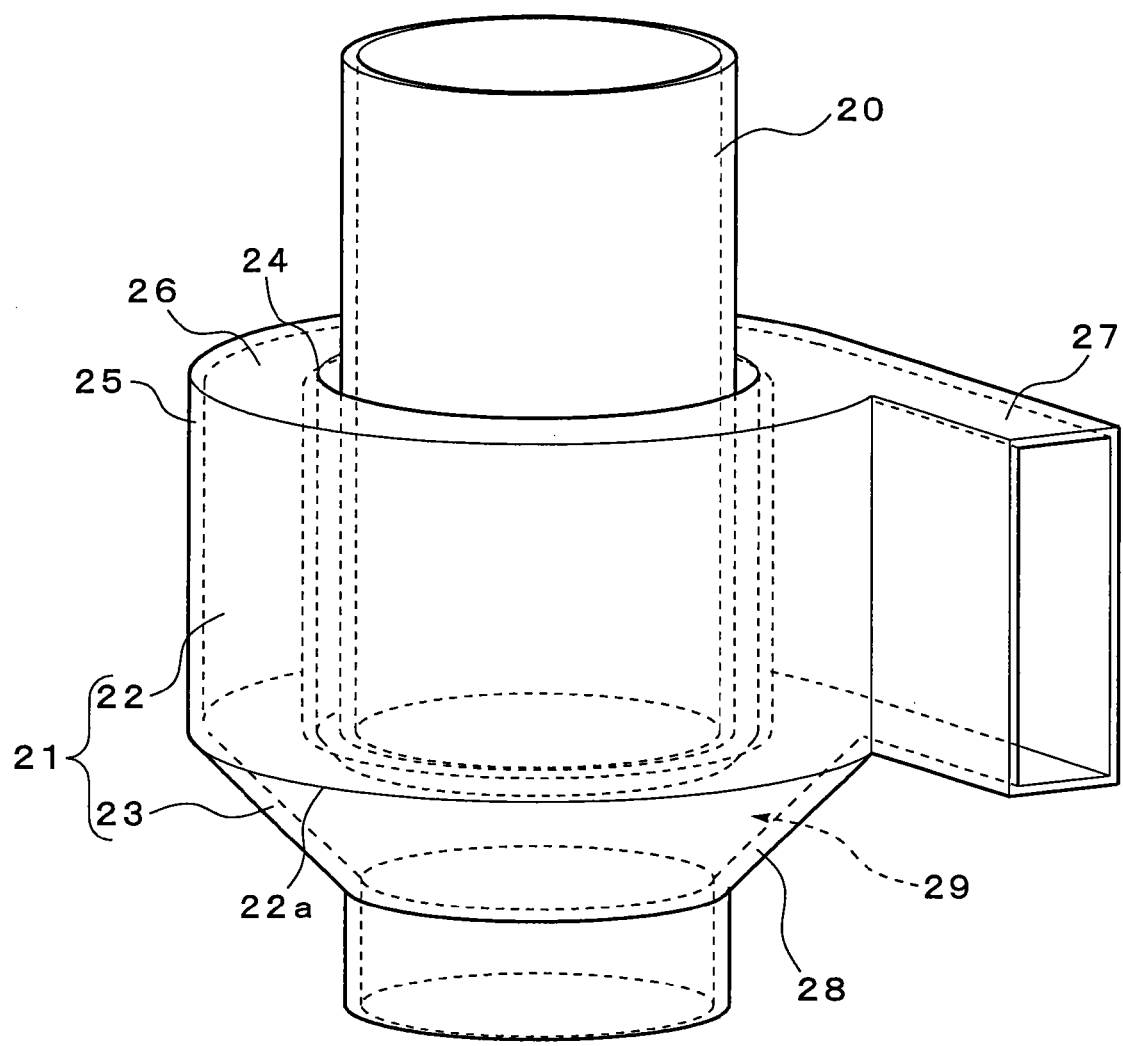
FIG. 1 is a perspective view of principal part showing a cooling pipe of a chlorine bypass device according to the present invention.
Figure 2:
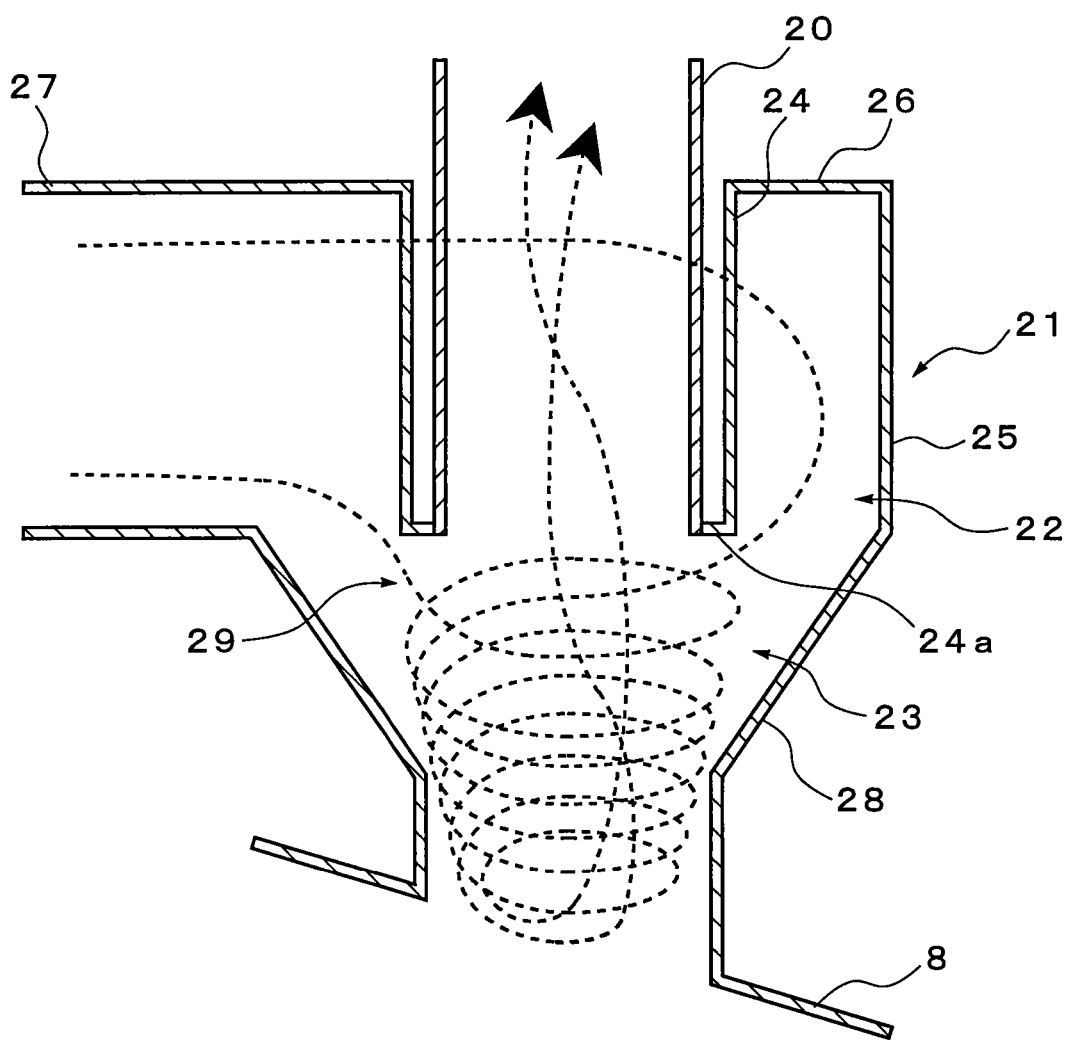
FIG. 2 is a longitudinal sectional view schematically showing a flow of cooling air in the cooling pipe of FIG. 1.
Figure 10:
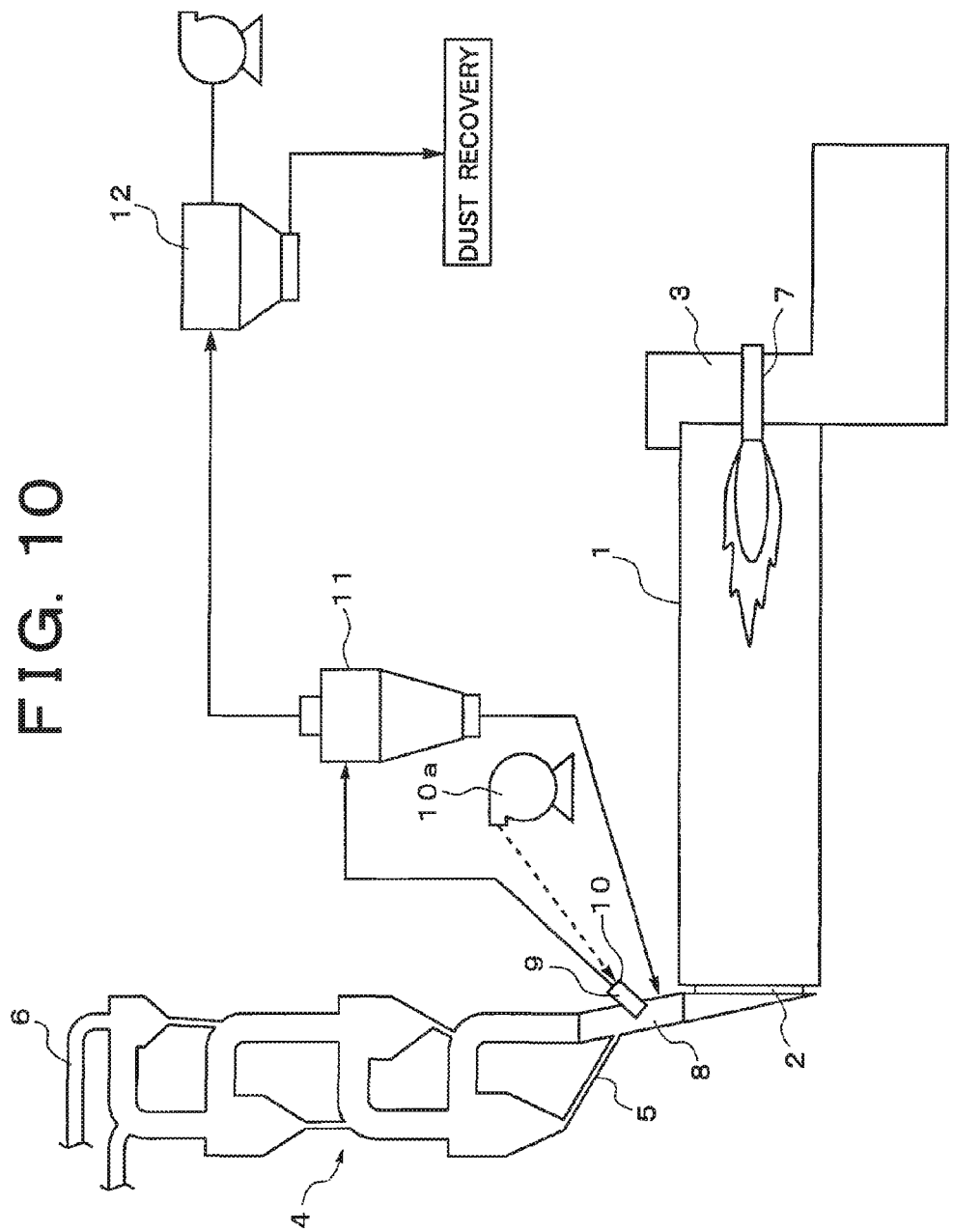
FIG. 10 is a schematic diagram showing a schematic configuration of a typical conventional cement manufacturing facilities equipped with a chlorine bypass device.
Figure 11:
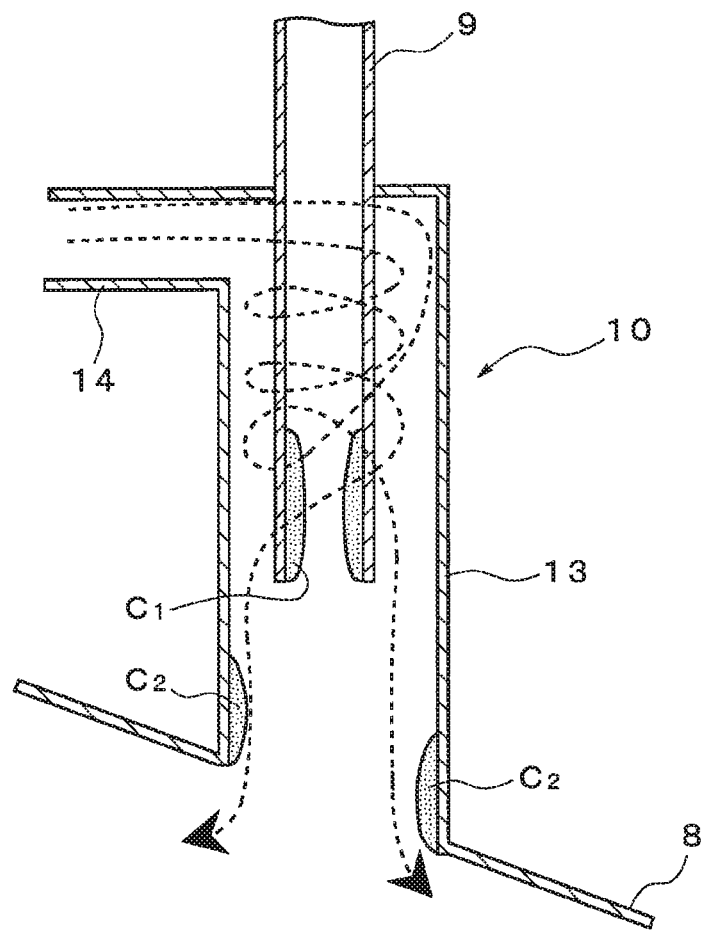
FIG. 11 is a longitudinal sectional view showing cooling means in the chlorine bypass device of FIG. 10.

FIGS. 1 and 2 show an extraction pipe as well as a cooling pipe for exhaust gas extracted from the extraction pipe in an embodiment of a chlorine bypass device according to the present invention, wherein other components are the same as those in FIG. 10, and thus are hereinafter denoted by the same reference numerals as the corresponding components in FIG. 10, and description thereof will be simplified.

In FIGS. 1 and 2, reference numeral 20 denotes the extraction pipe connected at a lower end in FIGS. 1 and 2 with an exhaust gas pipe 8 from a kiln inlet part 2 of a rotary kiln 1 and adapted to extract part of exhaust gas. Reference numeral 21 denotes a cooling pipe 21 adapted to quickly cool the exhaust gas extracted by the extraction pipe 20, using cooling air sent from a blower 10a.

The cooling pipe 21 generally includes a revolving portion 22 and an introducing portion 23 formed integrally with an end 22a of the revolving portion 22 on the side of an exhaust gas pipe 8 and connected to the extraction pipe 20. The revolving portion 22 is formed into an annular shape by being made up of an inner pipe 24 configured to be cylindrical in shape, an outer pipe 25 configured to be cylindrical in shape and placed on an outer side of the inner pipe 24 with axes of the inner and outer pipes 24 and 25 brought into coincidence with each other, and a top panel 26 configured to close ends of the inner pipe 24 and outer pipe 25.

In the revolving portion 22, the inner pipe 24 is placed so as to surround an outer wall of the extraction pipe 20 at a predetermined interval with coincidence of respective axes. Also, spacing between lower ends of the inner pipe 24 and extraction pipe 20 in FIGS. 1 and 2 is closed by a bottom plate 24a. Also, a cooling air duct 27 from the blower 10a is connected to the inner pipe 24 and the outer pipe 25 in a tangential direction to introduce the cooling air into the revolving portion 22 in a circumferential direction.

On the other hand, the introducing portion 23 is formed so as to communicate with the revolving portion 22 via a conical pipe (reduced-diameter pipe) 28 whose tip is joined to the outer wall of the extraction pipe 20 by being gradually reduced in diameter from the end 22a of the outer pipe 25 of the revolving portion 22 toward the side of the exhaust gas pipe 8.

On the other hand, in the introducing portion 23, an outer wall portion of the extraction pipe 20 facing the conical pipe 28 is open, forming a flow inlet 29 for the cooling air over an entire circumference. Consequently, a flow path 30 (see FIGS. 4A to 6) for the cooling air is formed in the cooling pipe 21, running from the revolving portion 22 to the introducing portion 23 to the flow inlet 29.

Figure 4A:
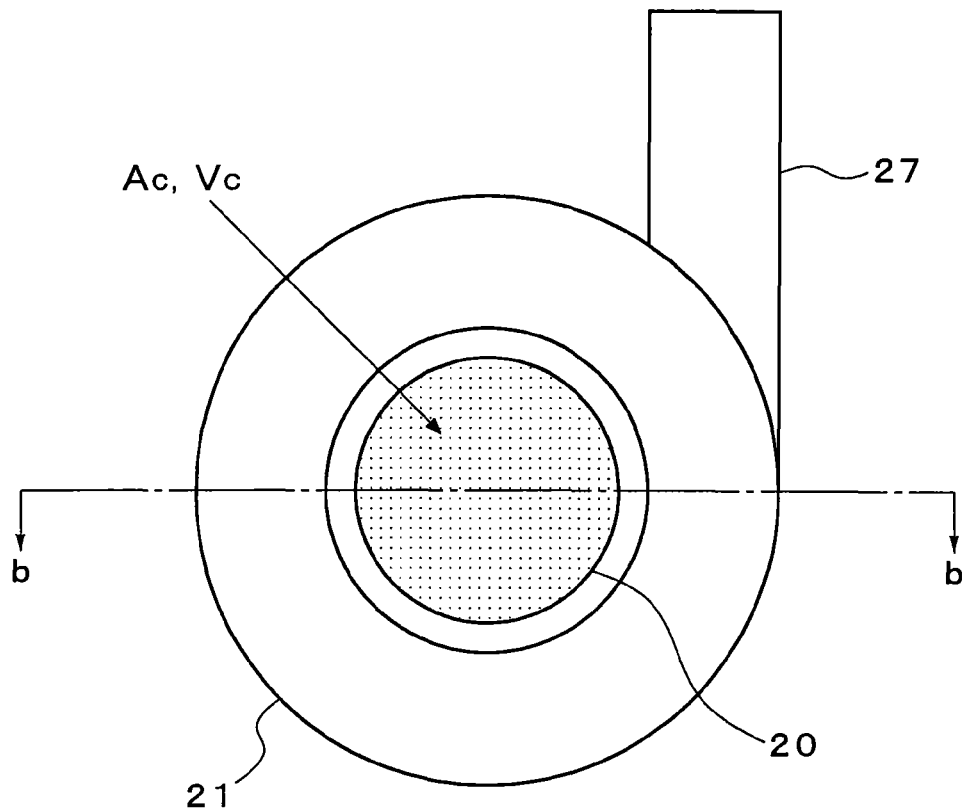
FIG. 4A is a schematic diagram showing a definition of $V_C$ according to the present invention.
Figure 4B:
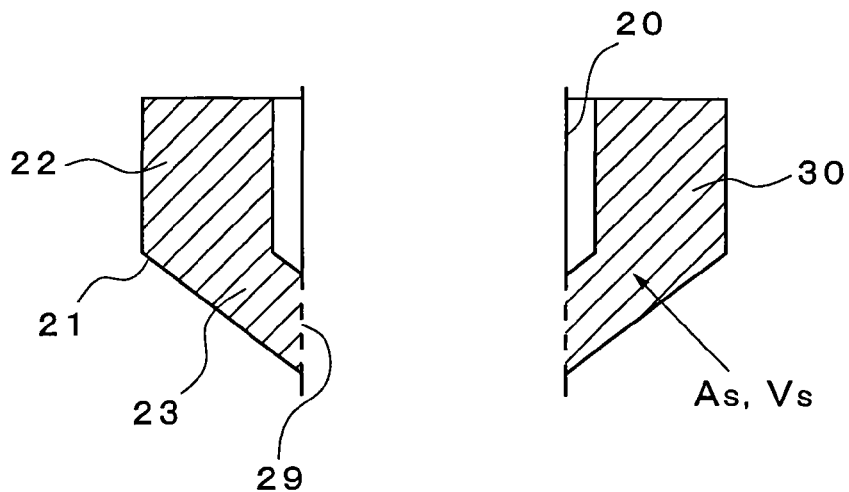
FIG. 4B is also a schematic diagram showing a definition of $V_S$ and is a sectional view taken along line b-b in FIG. 4A.

If the average flow velocity of the bleed gas in the cross section orthogonal to the axial direction of the extraction pipe 20 is $V_C$ (m/s) as shown in FIG. 4A, where the average flow velocity $V_C$ (m/s) is obtained by dividing a flow rate $Q_C$ (Nm³/s) of the bleed gas passing the cross section in the direction perpendicular to the plane of the paper in FIG. 4A by the area $A_C$ (m²) of the cross section, and if the average flow velocity of the cooling air in the longitudinal section of the cooling air flow path 30 in the cooling pipe 21 along the axial direction is $V_S$ (m/s) as shown in FIG. 4B, where the average flow velocity $V_S$ (m/s) is obtained by dividing a flow rate Q (Nm³/s) of the cooling air passing the longitudinal section in the direction perpendicular to the plane of the paper in FIG. 4B by the longitudinal sectional area $A_S$ (m²), dimensional data on the cooling pipe 21 is set to satisfy $$1.0 \leq V_S/V_C.$$

Figure 5:
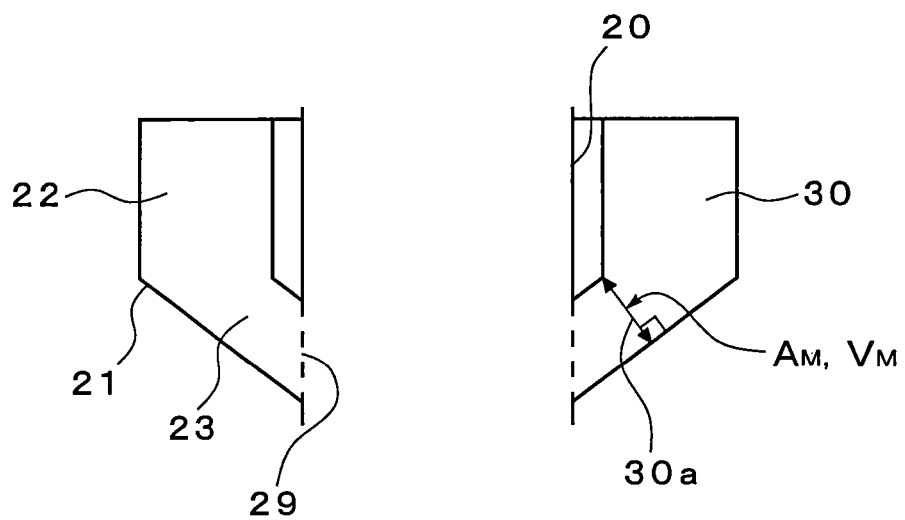
FIG. 5 is a schematic diagram showing a definition of $V_M$ according to the present invention.

Furthermore, if the average flow velocity of the cooling air in the narrowest portion 30a in the longitudinal section of the cooling air flow path 30 in the axial direction is $V_M$ (m/s) as shown in FIG. 5, where the average flow velocity $V_M$ (m/s) is obtained by dividing a flow rate of the cooling air flowing through the narrowest portion 30a from the side of the revolving portion 22 to the side of the introducing portion 23 by the circumferential area $A_M$ (m²) of the narrowest portion 30a shaped as a flank of a truncated cone, the dimensional data on the cooling pipe 21 is set such that resultant velocity $[V_S^2+V_M^2)^{1/2}]$ (m/s) of $V_S$ and $V_M$ will satisfy $$(V_S^2+V_M^2)^{1/2} \leq 90$$

With the chlorine bypass device equipped with the cooling pipe 21 configured as described above, since the revolving portion 22 of the cooling pipe 21 into which the cooling air is introduced is formed into an annular shape, surrounding the extraction pipe 20 of the exhaust gas via a gap between the extraction pipe 20 and inner pipe 24, the extraction pipe 20 is not cooled by the cooling air flowing through the revolving portion 22, and thus adhesion of coatings to an inner wall of the extraction pipe 20 can be prevented reliably.

Also, in the cooling pipe 21, the cooling air introduced in the circumferential direction of the revolving portion 22 through the cooling air duct 27 is supplied from the revolving portion 22 to the introducing portion 23 gradually reduced in diameter, by revolving around the entire circumference and flows into the extraction pipe 20 through the flow inlet 29 formed around the entire circumference of the outer wall of the extraction pipe 20. Thus, in the extraction pipe 20, the extracted exhaust gas and the cooling air are stirred and mixed while revolving intensely, making it possible to produce fine chloride dust by quickly cooling the exhaust gas using the cooling air.

Consequently, since fine chloride dust can be produced by always cooling exhaust gas quickly by mixing extracted exhaust gas with cooling air at high efficiency even if the extraction ratio of the exhaust gas changes, chloride dust collection efficiency can be increased.

Furthermore, since the dimensional data on the cooling pipe 21 is set to satisfy $1.0 \leq V_S/V_C$, where $V_C$ is the average flow velocity of the bleed gas in the cross section orthogonal to the axial direction of the extraction pipe 20 and $V_S$ is the average flow velocity of the cooling air in the longitudinal section of the cooling air flow path 30 of the cooling pipe 21 in the axial direction, the gas cooling distance can be set to 1,200 mm or below at which a desired chloride dust refinement effect is obtained by quick cooling.

In addition, since the dimensional data on the cooling pipe 21 is set to satisfy $(V_S^2+V_M^2)^{1/2} \leq 90$, where $V_M$ is the average flow velocity of the cooling air in the narrowest portion 30a of the cooling air flow path 30, the pressure loss of the cooling air in the cooling pipe 21 can be kept to 1,200 mmAq or below, eliminating concerns that air supply means such as the blower would become excessively large.

EXAMPLES

Analysis Example 1

First, part of exhaust gas with a temperature of 1,200° C. discharged from the rotary kiln 1 to the exhaust gas pipe 8 was extracted from the extraction pipe 20 with extraction ratio (the ratio of the extracted amount of the kiln exhaust gases) of 2%, 4%, 6%, and 8%. The rotary kiln 1 had a production volume of 200 t/h. Cooling air (temperature 24° C.) with air volumes (2.7 to 3.0 times the extraction ratio) corresponding to the extraction ratio was introduced into the extraction pipe 20 from the cooling pipe 21. Then, in each case, the distance (mm) by which the cooling air descended from the connection (lower ends of the flow inlet 29) of the introducing portion 23 of the cooling pipe 21 to the side of the exhaust gas pipe 8 was calculated by analysis.

Figure 3:
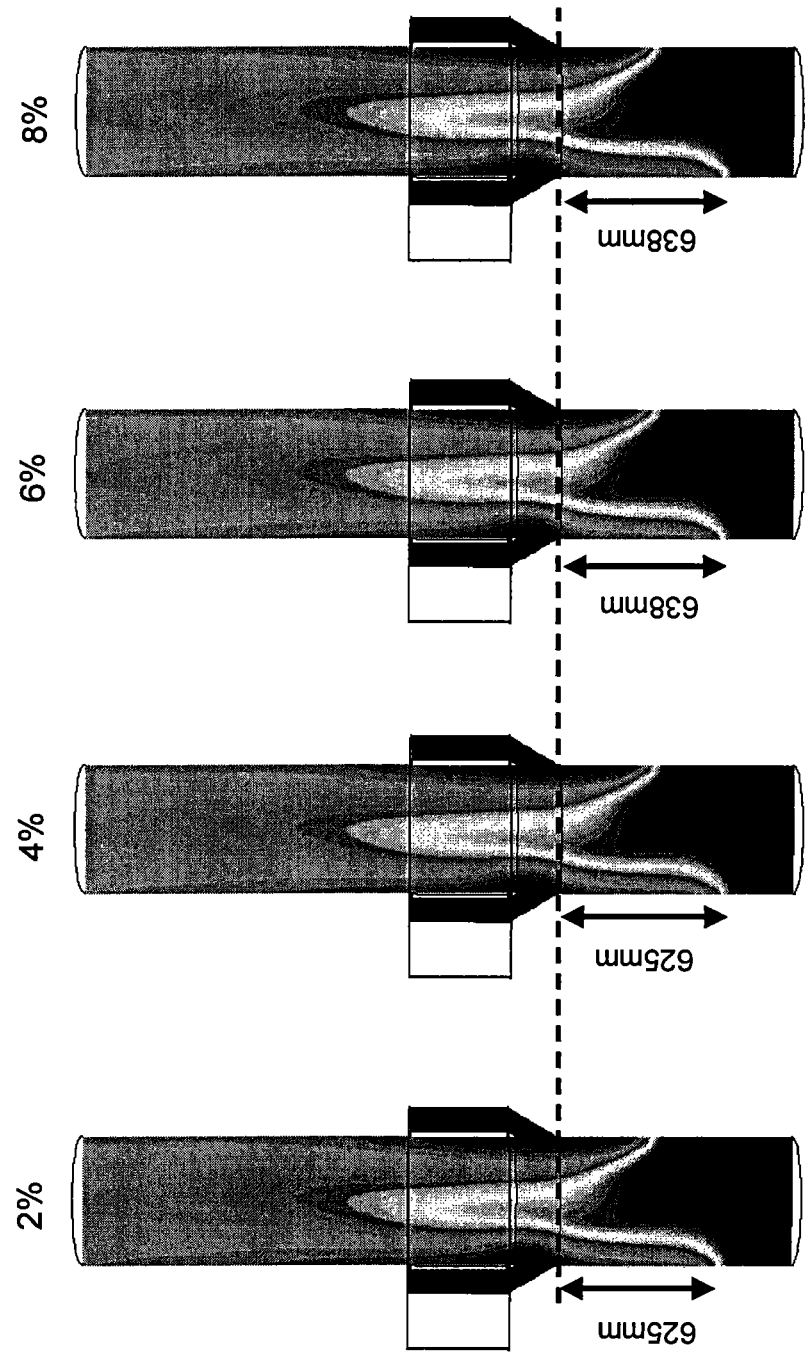
FIG. 3 is a diagram showing results of analyzing a descent distance of the cooling air with an extraction ratio (a ratio of the extracted amount of the kiln exhaust gas) varied, in an example of the present invention.

FIG. 3 shows results of the analysis.

As seen from FIG. 3, with the chlorine bypass device according to the present invention, even if the extraction ratio of the exhaust gas changes, the cooling pipe 21 allows the descent distance of the cooling air to remain almost constant, and thus the cooling air does not blow out into the exhaust gas pipe in spite of changes in the extraction ratio of the exhaust gas.

Analysis Example 2

Figure 6A:
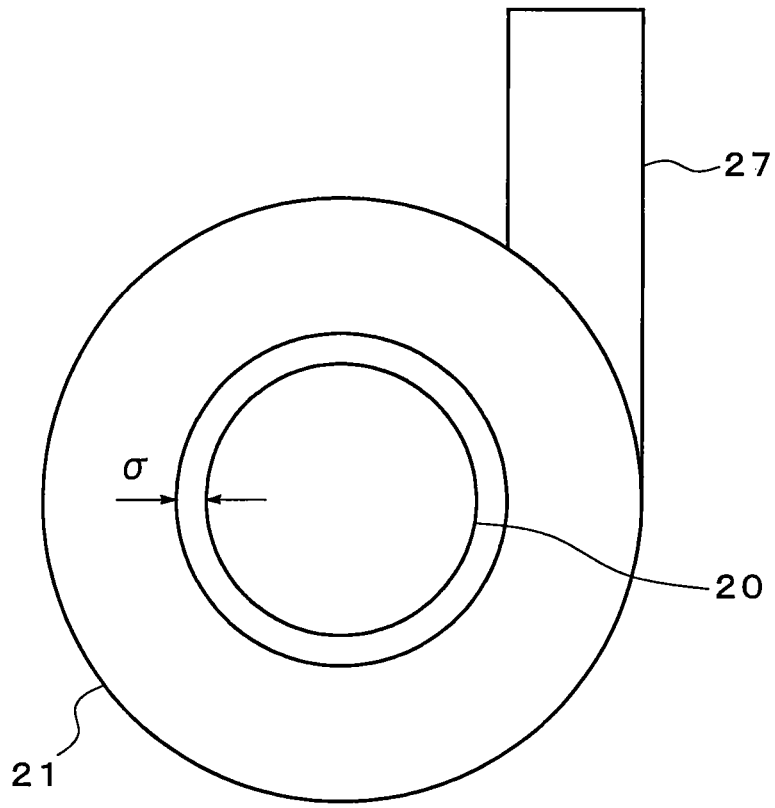
FIG. 6A is a schematic view showing dimensional data on the cooling pipe used for analysis in an example of the present invention.
Figure 6B:
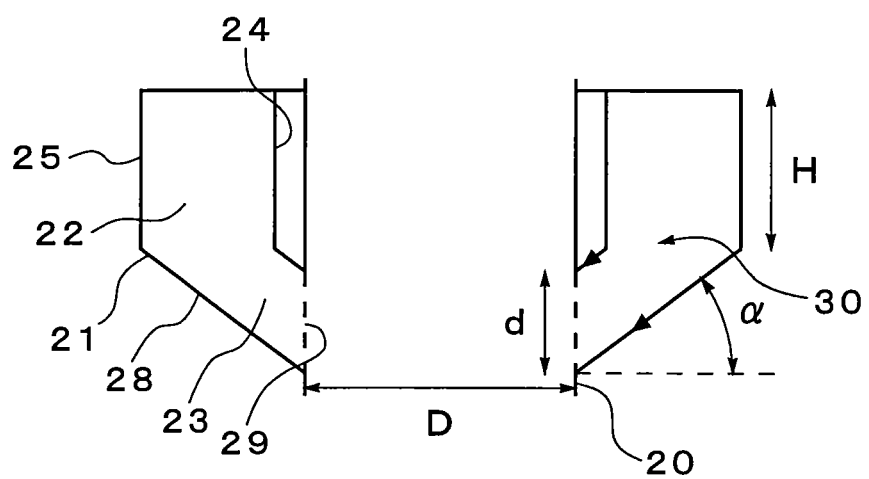
FIG. 6B is a schematic view showing dimensional data on the cooling pipe used for analysis in an example of the present invention as in the case of FIG. 6A.

Next, using the cooling pipe 21 according to the present embodiment shown in FIG. 1, the gas cooling distance and the pressure loss were determined by analysis by varying data including the inside diameter size D (m) of the extraction pipe 20, the height size H (m) of the revolving portion 22, height size d (m) of the flow inlet 29 in the axial direction, and inclination angle α of the conical pipe 28 as shown in FIGS. 6A and 6B. In so doing, the interval σ between the inner pipe 24 of the cooling pipe 21 and the extraction pipe 20 was 0.01 m in all cases.

Incidentally, in FIGS. 6A and 6B, the longitudinal sectional area $A_S$ of the cooling air flow path 30 in the axial direction, i.e., the sum of the areas of the revolving portion 22 and the introducing portion 23 can be expressed by $$A_S \text{ (m}^2\text{)} = d^2 \sin \alpha \cdot \cos \alpha + 2d\sigma + d^2(\cos^3\alpha/\sin \alpha) + 2d(H/\tan \alpha).$$

When the cooling air volume is Q (Nm³/s), the average flow velocity $V_S$ (m/s) of the cooling air in the longitudinal section is given by $V_S=Q/A_S$.

Also, in the longitudinal section of the cooling air flow path 30 in the axial direction shown in FIG. 5, the circumferential area $A_M$ of the narrowest portion 30a shaped as a flank of a truncated cone can be expressed by $$A_M \text{ (m}^2\text{)} = \pi(2D+d \sin \alpha \cdot \cos \alpha)((d \cos^2\alpha)^2 + (d \sin \alpha \cdot \cos \alpha)^2)^{1/2}.$$

Thus, the velocity $V_M$ (m/s) of the cooling air passing through the narrowest portion 30a is given by $V_M=Q/A_M$.

TABLE 1

| | D (m) | $A_C$ (m²) | $A_S$ (m²) | $A_M$ (m²) | $V_C$ (m/s) | $V_S$ (m/s) | $V_M$ (m/s) | $V_S/V_C$ | $(V_S^2 + V_M^2)^{1/2}$ (m/s) | Gas cooling distance (mm) | Pressure loss (mmAq) |
|---|---|---|---|---|---|---|---|---|---|---|---|
| Analysis example 1 | 0.5 | 0.2 | 0.2 | 0.4 | 8.7 | 19.2 | 11.5 | 2.2 | 22.4 | 867 | 284 |
| Analysis example 2 | 0.5 | 0.2 | 0.4 | 0.8 | 8.7 | 13.1 | 6.2 | 1.5 | 14.5 | 1086 | 319 |

TABLE 1-continued

| | D (m) | $A_C$ (m²) | $A_S$ (m²) | $A_M$ (m²) | $V_C$ (m/s) | $V_S$ (m/s) | $V_M$ (m/s) | $V_S/V_C$ | $(V_S^2 + V_M^2)^{1/2}$ (m/s) | Gas cooling distance (mm) | Pressure loss (mmAq) |
|---|---|---|---|---|---|---|---|---|---|---|---|
| Analysis example 3 | 0.5 | 0.2 | 0.2 | 0.5 | 8.7 | 20.0 | 8.8 | 2.3 | 21.9 | 1044 | 402 |
| Analysis example 4 | 0.5 | 0.2 | 0.1 | 0.3 | 8.7 | 68.5 | 14.2 | 7.9 | 70.0 | 507 | 679 |
| Analysis example 5 | 0.5 | 0.2 | 0.1 | 0.3 | 8.7 | 78.4 | 15.8 | 9.0 | 80.0 | 464 | 936 |
| Analysis example 6 | 0.5 | 0.2 | 0.1 | 0.3 | 8.7 | 88.3 | 17.3 | 10.1 | 90.0 | 429 | 1108 |
| Analysis example 7 | 0.5 | 0.2 | 0.1 | 0.3 | 8.7 | 43.5 | 17.3 | 5.0 | 46.9 | 535 | 509 |
| Analysis example 8 | 0.5 | 0.2 | 0.2 | 0.6 | 4.3 | 10.8 | 3.9 | 2.5 | 11.5 | 857 | 322 |
| Analysis example 9 | 0.5 | 0.2 | 0.3 | 0.8 | 8.7 | 15.7 | 5.7 | 1.8 | 16.7 | 1193 | 376 |
| Analysis example 10 | 0.5 | 0.2 | 0.2 | 0.6 | 8.7 | 24.4 | 8.2 | 2.8 | 25.7 | 1131 | 397 |
| Analysis example 11 | 0.5 | 0.2 | 0.1 | 0.3 | 8.7 | 52.3 | 15.8 | 6.0 | 54.6 | 634 | 411 |
| Analysis example 12 | 0.7 | 0.4 | 5.3 | 7.2 | 4.4 | 0.9 | 0.7 | 0.2 | 1.1 | 1897 | 116 |
| Analysis example 13 | 0.7 | 0.4 | 0.3 | 0.7 | 4.4 | 14.7 | 6.9 | 3.3 | 16.2 | 983 | 201 |
| Analysis example 14 | 0.7 | 0.4 | 2.6 | 4.5 | 4.4 | 1.8 | 1.1 | 0.4 | 2.1 | 1842 | 173 |
| Analysis example 15 | 0.7 | 0.4 | 0.6 | 1.3 | 4.4 | 7.4 | 3.6 | 1.7 | 8.2 | 1113 | 382 |
| Analysis example 16 | 0.7 | 0.4 | 0.4 | 1.3 | 4.4 | 11.6 | 3.7 | 2.6 | 12.1 | 864 | 350 |
| Analysis example 17 | 0.7 | 0.4 | 0.4 | 0.5 | 4.4 | 12.9 | 9.9 | 2.9 | 16.3 | 1081 | 407 |
| Analysis example 18 | 0.7 | 0.4 | 0.3 | 0.9 | 4.4 | 18.2 | 5.3 | 4.1 | 19.0 | 777 | 325 |
| Analysis example 19 | 0.7 | 0.4 | 0.3 | 0.6 | 2.2 | 9.1 | 3.9 | 4.1 | 9.9 | 728 | 197 |
| Analysis example 20 | 0.7 | 0.4 | 0.3 | 0.6 | 6.6 | 27.2 | 11.8 | 4..1 | 29.6 | 795 | 537 |
| Analysis example 21 | 0.7 | 0.4 | 0.3 | 0.6 | 8.9 | 36.4 | 15.8 | 4.1 | 39.7 | 813 | 705 |
| Analysis example 22 | 0.7 | 0.4 | 0.0 | 0.1 | 1.2 | 84.0 | 44.1 | 70.3 | 94.9 | 307 | 1300 |
| Analysis example 23 | 0.7 | 0.4 | 0.0 | 0.1 | 1.1 | 85.6 | 46.9 | 74.8 | 97.6 | 299 | 1407 |
| Analysis example 24 | 0.7 | 0.4 | 0.0 | 0.1 | 1.1 | 89.9 | 42.2 | 79.7 | 99.3 | 251 | 1409 |
| Analysis example 25 | 0.7 | 0.4 | 0.0 | 0.1 | 1.1 | 95.8 | 44.5 | 85.4 | 105.6 | 238 | 1534 |
| Analysis example 26 | 0.7 | 0.4 | 1.3 | 1.8 | 4.4 | 3.6 | 2.6 | 0.8 | 4.4 | 1527 | 338 |
| Analysis example 27 | 0.7 | 0.4 | 5.3 | 4.1 | 4.4 | 0.9 | 1.1 | 0.2 | 1.4 | 1778 | 97 |
| Analysis example 28 | 0.7 | 0.4 | 0.4 | 0.4 | 4.4 | 10.7 | 10.6 | 24 | 15.0 | 883 | 273 |
| Analysis example 29 | 0.7 | 0.4 | 0.1 | 0.2 | 4.4 | 36.0 | 23.8 | 8.1 | 43.2 | 673 | 439 |
| Analysis example 30 | 0.7 | 0.4 | 0.5 | 0.7 | 4.4 | 10.2 | 7.1 | 2.3 | 12.4 | 833 | 466 |
| Analysis example 31 | 1.5 | 1.8 | 0.4 | 1.4 | 1.0 | 12.2 | 3.4 | 12.6 | 12.6 | 513 | 613 |
| Analysis example 32 | 1.5 | 1.8 | 0.2 | 0.8 | 1.0 | 26.9 | 6.1 | 27.8 | 27.6 | 441 | 794 |
| Analysis example 33 | 1.5 | 1.8 | 0.0 | 0.2 | 1.0 | 111.4 | 22.5 | 115.1 | 113.6 | 239 | 1826 |
| Analysis example 34 | 1.5 | 1.8 | 0.0 | 0.3 | 1.0 | 116.9 | 14.6 | 120.8 | 117.8 | 211 | 2091 |
| Analysis example 35 | 1.5 | 1.8 | 2.2 | 3.0 | 1.0 | 2.1 | 1.6 | 2.2 | 2.7 | 936 | 284 |
| Analysis example 36 | 1.5 | 1.8 | 1.1 | 1.5 | 1.0 | 4.5 | 3.1 | 4.6 | 5.4 | 748 | 457 |

Table 1 is a chart of analysis results in examples of the present invention, showing results of calculating the gas cooling distance and the pressure loss based on $A_S$ and $A_M$ by varying data including the inside diameter size D of the extraction pipe 20, the height size H of the revolving portion 22, the height size d of the flow inlet 29 in the axial direction, and the inclination angle α of the conical pipe 28 as described above.

The analysis results were obtained using an extraction ratio (the ratio of the extracted amount of the kiln exhaust gases) of 2.0% (bleed gas flow rate $Q_C$=0.9 Nm³/s, cooling air flow rate Q=2.3 Nm³/s) in analysis examples 8 and 19, an extraction ratio of 4.0% (bleed gas flow rate $Q_C$=1.7 Nm³/s, cooling air flow rate Q=4.7 Nm³/s) in analysis examples 1 to 7, 9 to 18 and 22 to 36, an extraction ratio of 6.0% (bleed gas flow rate $Q_C$=2.6 Nm³/s, cooling air flow rate Q=7.0 Nm³/s) in analysis example 20, and an extraction ratio of 8.0% (bleed gas flow rate $Q_C$=3.4 Nm³/s, cooling air flow rate Q=9.4 Nm³/s) in analysis example 21.

FIG. 7 is the characteristic diagram of analysis results in Table 1, showing the relationship between $V_S/V_C$ and the gas cooling distance. FIG. 8 is an enlarged view of that portion of FIG. 7 which satisfies $V_S/V_C$≤15.0. FIG. 9 is also the characteristic diagram of analysis results in Table 1, showing the relationship between $(V_S^2+V_M^2)^{1/2}$ and the pressure loss.

As can be seen from FIG. 8, when the dimensional data on the cooling pipe 21 is set to satisfy 1.0≤$V_S/V_C$, the gas cooling distance can be set to 1,200 mm or below at which a desired chloride dust refinement effect is obtained by quick cooling.

Also, as can be seen from FIG. 9, when the dimensional data on the cooling pipe is set to satisfy $(V_S^2+V_M^2)^{1/2}$≤90, the pressure loss can be set to 1,200 mmAq or below which makes blower capacity conventionally used for chlorine bypass fully applicable.

Note that although in the above embodiment and examples, only the conical pipe 28 has been described as the reduced-diameter pipe which defines the outer wall of the introducing portion 23, the present invention is not limited to this and may use any of various reduced-diameter pipes as long as the pipe is joined at a first end to the exhaust-gas-pipe-side end of the outer pipe 25 and is joined at a second end further reduced in diameter compared to the first end to the outer wall of the extraction pipe 20. Even when a reduced-diameter pipe of another shape is used, the average flow velocities $V_S$ and $V_M$ can similarly be calculated by determining the areas $A_S$ and $A_M$ using drawings.

Also, plural cooling air ducts 27 can be connected to the cooling pipe 21.

INDUSTRIAL APPLICABILITY

The present invention provides a chlorine bypass device which can prevent adhesion of coatings to an inner wall of an extraction pipe, always cool exhaust gas quickly by mixing extracted exhaust gas with cooling air at high efficiency even if the extraction ratio of the exhaust gas changes, thereby produce fine chloride dust, and increase dust collection efficiency.

REFERENCE SIGNS LIST

1 Rotary kiln (kiln)
4 Preheater
8 Exhaust gas pipe

10a Blower
20 Extraction pipe
21 Cooling pipe
22 Revolving portion
22a Exhaust-gas-pipe-side end
23 Introducing portion
24 Inner pipe
25 Outer pipe
26 Top panel
27 Cooling air duct
28 Conical pipe (reduced-diameter pipe)
29 Flow inlet
30 Cooling air flow path
30a Narrowest portion

The invention claimed is:

1. A cement manufacturing facility for removing chlorine compounds from an exhaust gas stream, comprising;
a preheated supply of cement raw material;
a rotary kiln connected to an exhaust gas pipe having a diameter from 0.5 to 1.5 meters and adapted to heat an exhaust gas comprising a chloride; and
a chlorine bypass device comprising:
an extraction pipe connected to the exhaust gas pipe and adapted to extract pan of the exhaust gas comprising the chloride;
a cooling means adapted to supply cooling gas for the exhaust gas into the extraction pipe; and
a recovery device adapted to recover chloride dust contained in the exhaust gas extracted by the extraction pipe,
wherein the cooling means comprises a cooling pipe adapted to cause cooling air to flow into the extraction pipe and a blower adapted to feed the cooling air to the cooling pipe, and
the cooling pipe comprises a revolving portion and an introducing portion, where the revolving portion comprises an inner pipe configured to be cylindrical in shape and adapted to surround an outer wall of the extraction pipe via a gap and an outer pipe configured to be cylindrical in shape and placed on an outer side of the inner pipe,
the revolving portion is closed between an exhaust-gas-pipe-side end of the inner pipe and the extraction pipe and closed by an annular top panel between an end of the inner pipe and an end of the outer pipe,
the end of the inner pipe is on the side opposite the exhaust-gas-pipe-side end, and the introducing portion is defined by a reduced-diameter pipe which is joined at a first end to an exhaust-gas-pipe-side end of the outer pipe of the revolving portion and joined at a second end to the outer wall of the extraction pipe, the second end being reduced in diameter compared to the first end, and
a cooling air duct from the blower is connected to the revolving portion so as to introduce the cooling air in a circumferential direction of the revolving portion and a flow inlet adapted to cause the cooling air from the introducing portion to flow into the extraction pipe is formed over an entire circumference of the outer wall of the extraction pipe, thereby forming a flow path for the cooling air, running from the revolving portion to the flow inlet through the introducing portion.

2. The cement manufacturing facility according to claim 1, wherein the inner pipe, the outer pipe, and the reduced-diameter pipe are placed with respective axes brought into coincidence with an axis of the extraction pipe, and the cooling pipe is formed so as to satisfy $1.0 \leq V_S/V_C$, where $V_S$ is an average flow velocity of the cooling air in a longitudinal section of the flow path for the cooling air in a direction of the axis and $V_C$ is an average flow velocity of the extraction gas in a cross section orthogonal to a direction of the axis of the extraction pipe.

3. The cement manufacturing facility according to claim 1, wherein the inner pipe, the outer pipe, and the reduced-diameter pipe are placed with respective axes brought into coincidence with an axis of the extraction pipe, and the cooling pipe is formed so as to satisfy $(V_S^2+V_M^2)^{1/2} \leq 90$, where $V_S$ (m/s) is an average flow velocity of the cooling air in a longitudinal section of the flow path for the cooling air in a direction of the axis and $V_M$ (m/s) is an average flow velocity of the cooling air in a longitudinal section of the narrowest portion of the introducing portion.

4. The cement manufacturing facility according to claim 1, wherein the exhaust gas pipe is configured in the cement manufacturing facility to send exhaust gas discharged from a kiln adapted to burn cement material to a preheater adapted to preheat the cement raw material.

5. The cement manufacturing facility according to claim 2, wherein the inner pipe, the outer pipe, and the reduced-diameter pipe are placed with respective axes brought into coincidence with an axis of the extraction pipe, and the cooling pipe is formed so as to satisfy $(V_S^2+V_M^2)^{1/2} \leq 90$, where $V_S$ (m/s) is an average flow velocity of the cooling air in a longitudinal section of the flow path for the cooling air in a direction of the axis and $V_M$ (m/s) is an average flow velocity of the cooling air in a longitudinal section of the narrowest portion of the introducing portion.

6. The cement manufacturing facility according to claim 2, wherein the exhaust gas pipe is configured in the cement manufacturing facility to send exhaust gas discharged from a kiln adapted to burn cement material to a preheater adapted to preheat the cement raw material.

7. The cement manufacturing facility according to claim 3, wherein the exhaust gas pipe is configured in the cement manufacturing facility to send exhaust gas discharged from a kiln adapted to burn cement material material to a preheater adapted to preheat the cement raw material.

8. The cement manufacturing facility according to claim 1, wherein the preheated supply of cement raw material is heated in the rotary kiln to a temperature sufficient to volatilize alkali chlorides.

9. The cement manufacturing facility according to claim 1, wherein the exhaust gas is discharged from the rotary kiln at temperature of from 1200° C. to 1400° C.

* * * * *